US011946590B2

(12) United States Patent
Sato (10) Patent No.: US 11,946,590 B2
(45) Date of Patent: Apr. 2, 2024

(54) LEG OPENING ANGLE CHANGING MEMBER FOR STAND AND STAND

(71) Applicant: HOSHINO GAKKI CO., LTD., Aichi (JP)

(72) Inventor: Naoki Sato, Nagoya (JP)

(73) Assignee: HOSHINO GAKKI CO., LTD., Nagoya (JP)

( * ) Notice: Subject to any disclaimer, the term of this patent is extended or adjusted under 35 U.S.C. 154(b) by 0 days.

(21) Appl. No.: 18/049,608

(22) Filed: Oct. 25, 2022

(65) Prior Publication Data

US 2023/0147593 A1 May 11, 2023

(30) Foreign Application Priority Data

Nov. 8, 2021 (JP) .................................. 2021-181790

(51) Int. Cl.
*F16M 11/24* (2006.01)
*F16M 11/38* (2006.01)
*H04R 1/08* (2006.01)
*F16M 11/00* (2006.01)

(52) U.S. Cl.
CPC .............. *F16M 11/24* (2013.01); *H04R 1/08* (2013.01); *F16M 11/00* (2013.01); *F16M 2200/00* (2013.01); *F16M 2200/02* (2013.01); *F16M 2200/08* (2013.01)

(58) Field of Classification Search
CPC .... F16M 11/24; F16M 11/16; F16M 2200/00; F16M 2200/02; F16M 2200/08; F16M 11/38; H04R 1/08
See application file for complete search history.

(56) References Cited

U.S. PATENT DOCUMENTS

| | | | | |
|---|---|---|---|---|
| 4,377,269 A | * | 3/1983 | Sellner | F16M 11/10 248/188.7 |
| 4,905,946 A | * | 3/1990 | Wang | F16M 11/16 403/92 |
| 5,060,894 A | * | 10/1991 | Hillinger | F16M 11/16 403/166 |
| 5,082,222 A | * | 1/1992 | Hsu | F16M 11/16 248/170 |
| 5,340,066 A | | 8/1994 | Ditch | |
| 5,340,068 A | * | 8/1994 | Sarkisian | F16M 11/242 248/170 |
| 6,412,737 B1 | | 7/2002 | Minagawa | |
| 2015/0233522 A1 | | 8/2015 | Kallas et al. | |
| 2018/0274716 A1 | | 9/2018 | Kallas et al. | |

* cited by examiner

*Primary Examiner* — Tan Le (57) ABSTRACT

A leg opening angle changing member includes an insertion portion arranged between a leg attaching portion of a base of a stand and the proximal end of a leg of the stand, and an attachment portion attached to the leg attaching portion or the proximal end of the leg. The leg opening angle changing member is attached to the leg attaching portion or the proximal end of the leg by means of the attachment portion. The leg opening angle changing member is configured to change the leg opening angle to an opening angle smaller than an opening angle of the leg in a fully opened state by arranging the insertion portion between the leg attaching portion and the proximal end of the leg in a state in which the leg opening angle changing member is attached to the leg attaching portion or the proximal end of the leg.

13 Claims, 8 Drawing Sheets

LEG OPENING ANGLE CHANGING MEMBER FOR STAND AND STAND

BACKGROUND

1. Field

The present disclosure relates to a leg opening angle changing member for a stand and to a stand.

2. Description of Related Art

In a live music performance or studio recording, multiple microphone stands may be set around a drum set. In such a case, the microphone stands are set near a drumhead or a cymbal in the limited space around the drum set. Accordingly, a microphone stand is often placed near a drum stand or a cymbal stand, and microphone stands are often placed close to each other. In this case, the stands must be set such that their tripods do not contact each other.

In order to set the stands without causing the tripods to contact each other, the stands described below may be used so that the tripods are arranged in a crossing manner. The description of U.S. Pat. No. 5,340,066, the description of U.S. Pat. No. 6,412,737, and the description of U.S. Patent Application Publication No. 2018/0274716 each disclose a microphone stand that includes a tripod structure with a changeable leg opening angle. These microphone stands each include a pipe to which a microphone is attached, a base to which the lower end of the pipe is fixed, and three legs attached to the base in an openable manner. The base includes leg attaching portions at sections to which the three legs are coupled. The proximal ends of the legs are inserted into and attached to the leg attaching portions.

The stand disclosed in U.S. Pat. No. 5,340,066 includes sleeves slidably attached to the legs as means for changing the leg opening angles. The sleeves each include a sleeve main body attached to the outer circumferential surface of the leg and an insertion portion that protrudes toward the base from the sleeve main body. Each sleeve of this stand is slid in the longitudinal direction of the leg to insert the insertion portion into the leg attaching portion, so that the leg opening angle is changed to an opening angle smaller than the opening angle of the leg in a fully opened state. At this time, the leg opening angle is smaller than the opening angle of the leg in a fully opened state by the amount corresponding to the thickness of the insertion portion arranged between the wall surface of the leg attaching portion and the proximal end of the leg.

The stand disclosed in U.S. Pat. No. 6,412,737 includes, as means for changing the leg opening angle, a threaded hole formed in the proximal end of each leg and a screw threaded into the threaded hole. The screw is threaded to the threaded hole with its head contacting the inner wall of the leg attaching portion. This stand adjusts the leg opening angle in a continuous manner by changing the threaded amount of the screw into the threaded hole to change the protruding amount of the screw from the threaded hole.

The stand disclosed in U.S. Patent Application Publication No. 2018/0274716 includes a leg coupling structure that includes a ratchet as means for changing the leg opening angle. The leg coupling structure includes a ratchet attached to a leg attaching portion and a rod that is coupled to the ratchet while being slidably arranged inside the leg. The rod includes rod teeth in a section coupled to the ratchet. The rod teeth are engageable with teeth of ratchet. The ratchet structure of this stand changes the leg opening angle in a stepwise manner. Also, the engagement of the ratchet teeth and the rod teeth maintains the changed opening angle of the leg.

When changing the leg opening angle of the stand disclosed in U.S. Pat. No. 5,340,066, it is only necessary to slide the sleeve to a position where the insertion portion is inserted into the leg attaching portion. Therefore, the structure and operation are both simple. However, the force that maintains the changed leg opening angle is limited to the contact frictional force generated between the sleeve and the wall surface of the leg attaching portion or between the sleeve and the surface of the leg. Thus, the force that holds the sleeve at the position where the insertion portion is inserted into the leg attaching portion is insufficient. The insertion portion may come off the leg attaching portion in the axial direction of the leg during the use of the stand. Also, the leg opening angle cannot be maintained at the changed opening angle in some cases.

When changing the leg opening angle of the stand disclosed in U.S. Pat. No. 6,412,737, the screw must be manually rotated to adjust the protruding amount of the screw. It is bothersome to manually rotate the screw. Also, since the leg opening angle can be changed only by rotating the screw, it takes a relatively long time to change the leg opening angle. Further, when switching the leg between the fully open state and the closed state, the screw must be attached to or detached from the leg. It is also bothersome to attach or detach the screw.

The stand disclosed in U.S. Patent Application Publication No. 2018/0274716 can maintain the leg opening angle at the changed opening angle by means of the engagement of the ratchet teeth and the rod teeth. However, the ratchet structure has a high number of components and is complicated. Accordingly, the use of the ratchet structure in the leg coupling structure increases the component costs and the number of manufacturing steps. This increases the manufacturing costs.

SUMMARY

It is an objective of the present disclosure to provide a leg opening angle changing member for a stand and a stand that are capable of changing a leg opening angle and maintaining the changed opening angle with a simple structure.

In one general aspect, a leg opening angle changing member for a stand that changes a leg opening angle of the stand is provided. The stand includes a base to which the leg is openably attached. The base includes a leg attaching portion to which a proximal end of the leg is attached. The leg opening angle changing member includes an insertion portion arranged between the leg attaching portion and the proximal end of the leg, and an attachment portion attached to the leg attaching portion or the proximal end of the leg. The leg opening angle changing member is attached to the leg attaching portion or the proximal end of the leg by means of the attachment portion. The leg opening angle changing member is configured to change the leg opening angle to an opening angle smaller than an opening angle of the leg in a fully opened state by arranging the insertion portion between the leg attaching portion and the proximal end of the leg in a state in which the leg opening angle changing member is attached to the leg attaching portion or the proximal end of the leg.

In another general aspect, a stand is provided. The stand includes an elongated member to which an item is attached, a base to which a lower end of the elongated member is fixed, legs openably attached to the base, and leg opening angle changing members configured to change opening angles of the respective legs. The base includes leg attaching portions to which proximal ends of the respective legs are attached. Each leg opening angle changing member includes an insertion portion arranged between the leg attaching portion and the proximal end of the leg, and an attachment portion attached to the leg attaching portion or the proximal end of the leg. Each leg opening angle changing member is attached to the leg attaching portion or the proximal end of the leg by means of the attachment portion. Each leg opening angle changing member is configured to change the leg opening angle to an opening angle smaller than an opening angle of the leg in a fully opened state by arranging the insertion portion between the leg attaching portion and the proximal end of the leg in a state in which the leg opening angle changing member is attached to the leg attaching portion or the proximal end of the leg.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

First Embodiment

A leg opening angle changing member 20 according to a first embodiment will now be described with reference to FIGS. 1 to 7. The leg opening angle changing member 20 is used to change an opening angle of a leg 15 of a microphone stand 10.

Figure 1:
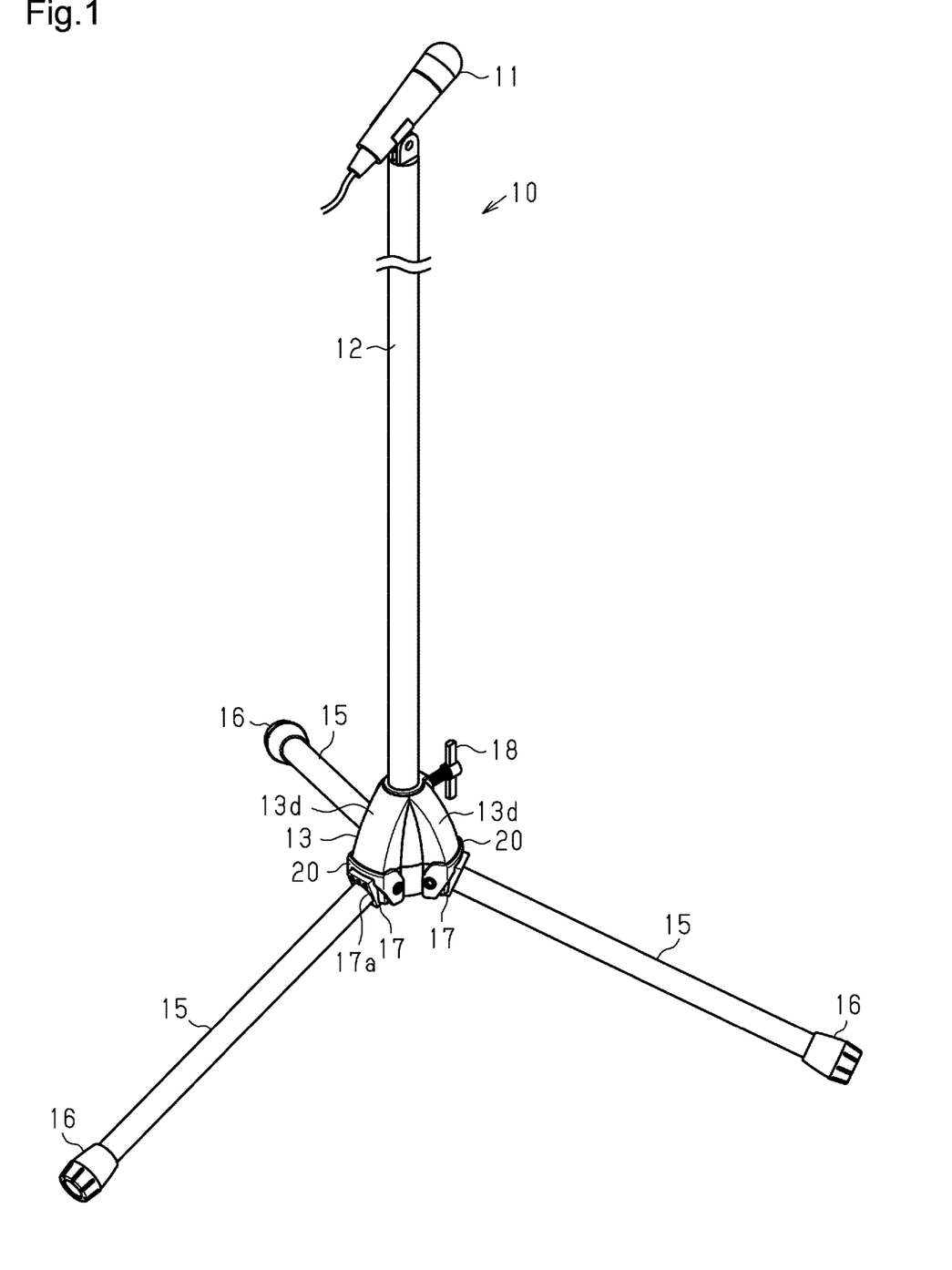
FIG. 1 is a perspective view of a microphone stand that includes leg opening angle changing members according to a first embodiment of the present disclosure.

As shown in FIG. 1, the microphone stand 10 includes a pipe 12, which is an elongated member. A microphone 11, which is an item, is attached to the pipe 12. Also, the microphone stand 10 includes a base 13, to which the lower end of the pipe 12 is fixed, and three legs 15, which are attached to the base 13 in an openable manner. The leg opening angle changing members 20 is attached to the base 13 at each of three sections to which the proximal ends of the three legs 15 are attached. The leg opening angle changing member 20 is used to change the opening angle of the leg 15.

Figure 2:
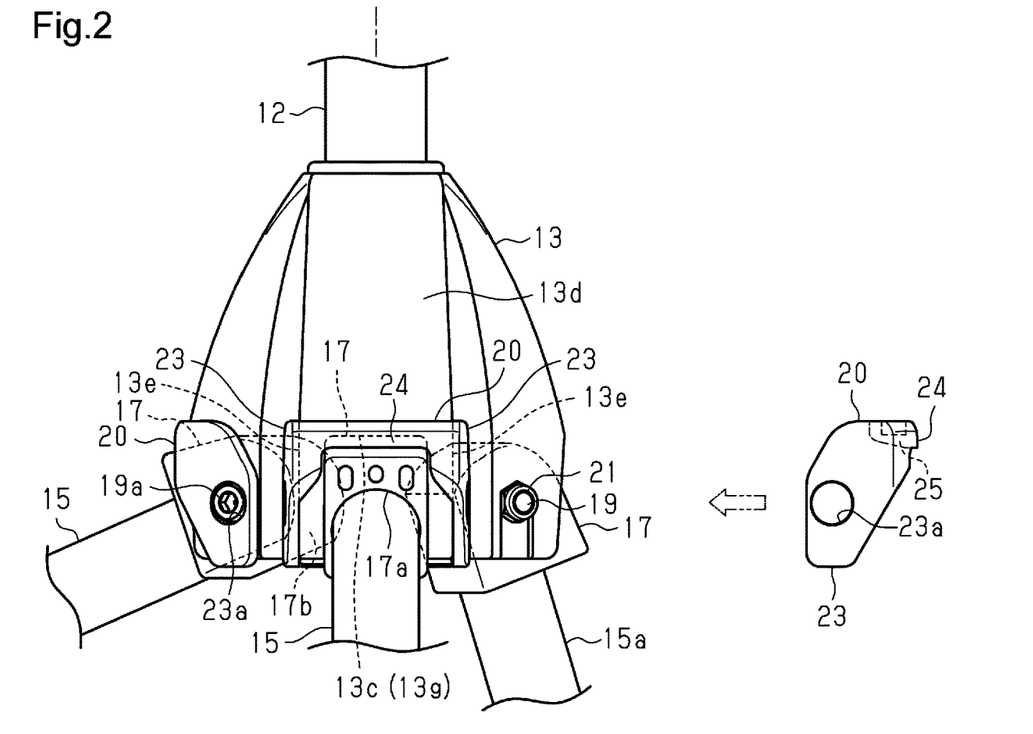
FIG. 2 is an enlarged partial front view showing a base of the microphone stand shown in FIG. 1 and a surrounding structure.

As shown in FIGS. 1 and 2, a rubber cap 16, which is an antislip member for the microphone stand 10, is attached to the distal end of each leg 15. Also, a leg holder 17, which is a plastic middle member, is attached to the proximal end of each leg 15. The leg holder 17 allows the leg 15 to open and close smoothly with respect to the base 13. Each leg holder 17 includes an opening 17a, into which the proximal end of the leg 15 is fitted, and has the shape of a substantially rectangular tube. The leg holder 17 includes a covering portion 17b on a side opposite to the opening 17a. The covering portion 17b covers the proximal end of the leg 15 and has a rounded shape.

Figure 3:
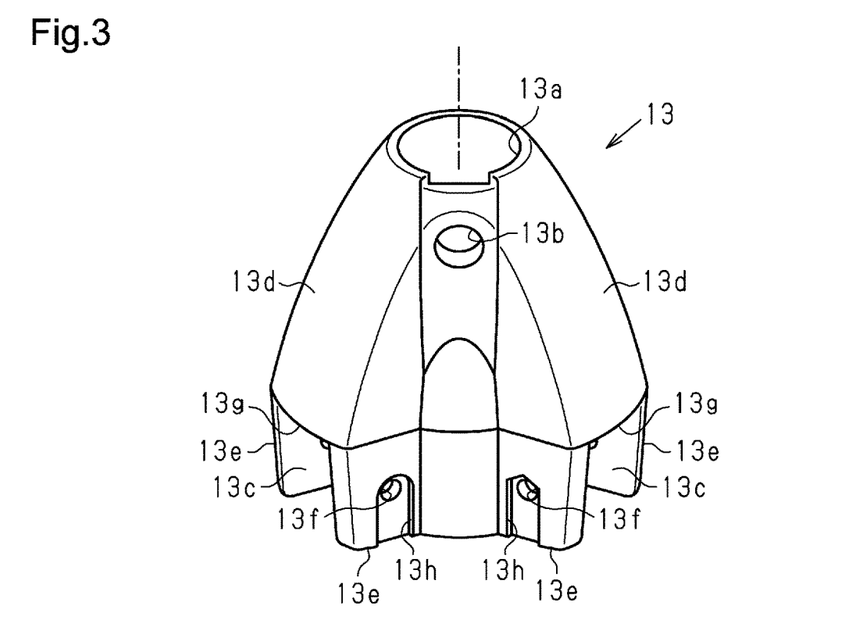
FIG. 3 is a perspective view of the base shown in FIG. 1.

As shown in FIG. 3, the base 13 is a tubular body having a substantially triangular shape when viewed from a side. The base 13 includes a fixing hole 13a and a bolt insertion hole 13b in an upper part. The lower end of the pipe 12 is fixed to the fixing hole 13a. A bolt 18 shown in FIG. 1 is inserted into the bolt insertion hole 13b. The base 13 includes three leg attaching portions 13c in a lower part. The proximal ends of the legs 15a are inserted into and attached to the leg attaching portions 13c. The three leg attaching portions 13c are arranged about the axis of the fixing hole 13a at constant angular intervals.

Each leg attaching portion 13c includes an extension wall 13d, which extends downward from the fixing hole 13a, and two side walls 13e, which extend downward from a lower edge 13g of the extension wall 13d. The extension wall 13d and the side walls 13e each form a part of the leg attaching portion 13c to which the proximal end of the corresponding leg 15 is attached. The leg attaching portion 13c is open sideward and downward in the base 13, so as to accommodate the proximal end of the leg 15 in an openable manner with respect to the base 13. Each side wall 13e includes a fit-in portion 13h on the outer surface. The fit-in portion 13h is a recess that extends upward from the lower edge of the side walls 13e. Each fit-in portion 13h includes a bolt receiving hole 13f at the center in the upper part to receive a bolt 19 shown in FIG. 2.

As shown in FIGS. 2 and 3, each leg 15 is inserted into the corresponding leg attaching portion 13c with the leg holder 17 attached to the proximal end of the leg 15. The leg 15 is attached to the lower part of the base 13 by the bolt 19 and a nut 21 with the proximal end of the leg 15 inserted into the leg attaching portion 13c. The bolt 19 is inserted from the outside of one of the side walls 13e and threaded to the nut 21 arranged on the outer side of the other side wall 13e.

Figure 4:
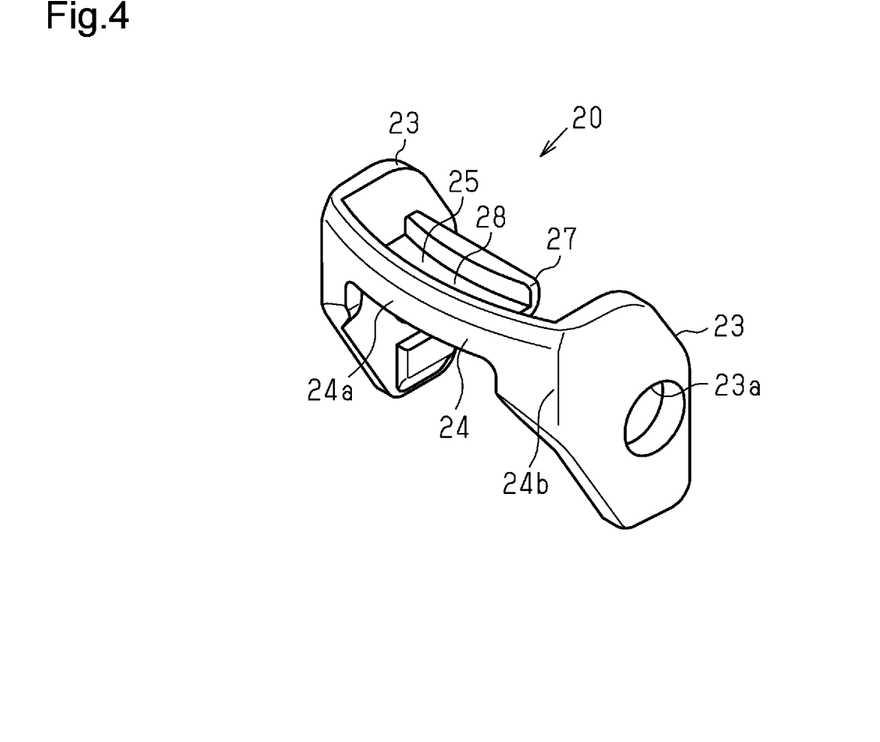
FIG. 4 is a perspective view of a leg opening angle changing member shown in FIG. 1 as viewed from a front side.
Figure 5:
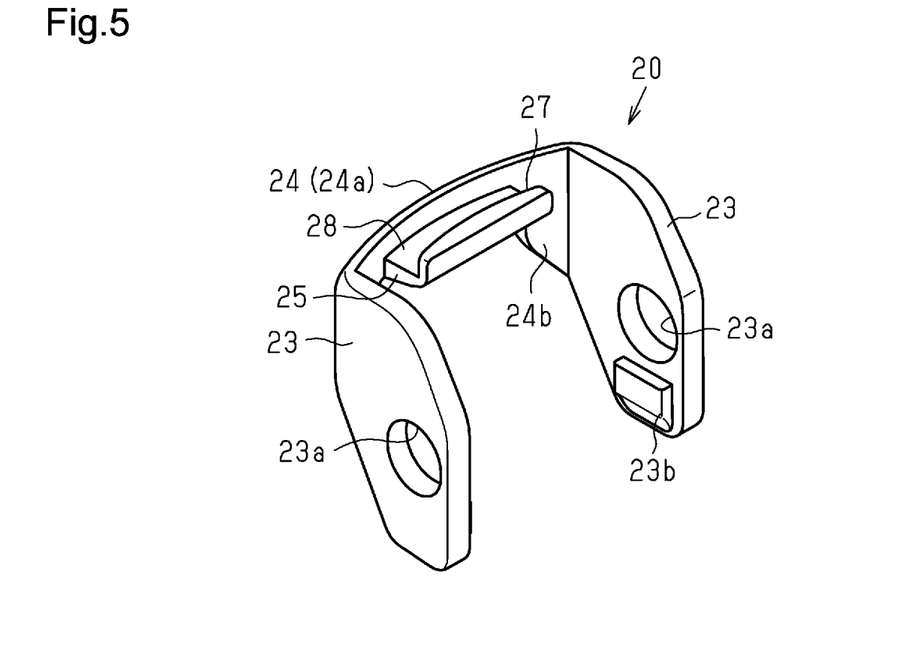
FIG. 5 is a perspective view of the leg opening angle changing member shown in FIG. 1 as viewed from a back side.

As shown in FIGS. 2, 4, and 5, each leg opening angle changing member 20 includes two attachment portions 23, a connecting portion 24, and an insertion portion 25. The leg opening angle changing member 20 is made of a plastic and has the shape of a U as a whole. The leg opening angle changing member 20 is configured to be attached to and detached from the leg attaching portion 13c of the base 13. The leg opening angle changing member 20 is configured such that, when attached to the leg attaching portion 13c, the insertion portion 25 is arranged between the lower edge 13g of the extension wall 13d and the leg holder 17 attached to the proximal end of the leg 15.

The attachment portions 23 are attached to the side walls 13e of the base 13 when the leg opening angle changing member 20 is attached to the leg attaching portion 13c. The attachment portions 23 each have an attachment hole 23a, which is a recess. The attachment portions 23 are attached to the side walls 13e of the base 13 by fitting a bolt head 19a into one of the attachment holes 23a and fitting the nut 21 into the other attachment hole 23a. The leg opening angle changing member 20 is attached to the leg attaching portion 13c of the base 13 by attaching the attachment portions 23 to the side walls 13e. The bolt head 19a and the nut 21 are projections provided on the side walls 13e of the base 13 and are provided at positions corresponding to the attachment holes 23a of the attachment portions 23. Each attachment portion 23 includes a projecting stopper 23b on the inner surface. The stoppers 23b are fitted into the fit-in portions 13h of the base 13.

The connecting portion 24 connects the front ends of the attachment portions 23 to each other and forms an ornamental surface, which is the front surface of the leg opening angle changing member 20. The connecting portion 24 has an elongated shape and is curved to protrude forward from the leg opening angle changing member 20. The connecting portion 24 includes sections of two different widths. That is, the connecting portion 24 includes a first connecting section 24a, which has a constant width, and second connecting sections 24b, which respectively connect the opposite ends of the first connecting section 24a to the attachment portions 23. The first connecting section 24a is a center section in the longitudinal direction of the connecting portion 24. The second connecting sections 24b are end sections in the longitudinal direction of the connecting portion 24.

As shown in FIGS. 2, 4, 5, and 7, the insertion portion 25 is arranged between the lower edge 13g of the extension wall 13d and an upper surface 17c of the leg holder 17 when the leg opening angle changing member 20 is attached to the leg attaching portion 13c. The insertion portion 25 extends rearward from the center of the back surface of the first connecting section 24a. The width of the insertion portion 25 is equivalent to the width of the lower edge 13g of the extension wall 13d. Also, the insertion portion 25 includes a protrusion 27, which extends along the rear edge of the insertion portion 25. Thus, at the center of the back surface of the first connecting section 24a, a space is defined by the back surface of the first connecting section 24a, the upper surface of the insertion portion 25, and the front surface of the protrusion 27. The space functions as a fitting recess 28. The fitting recess 28 is engaged with the lower edge 13g of the extension wall 13d, which functions as a fitting projection, when the leg opening angle changing member 20 is attached to the leg attaching portion 13c.

Figure 6:
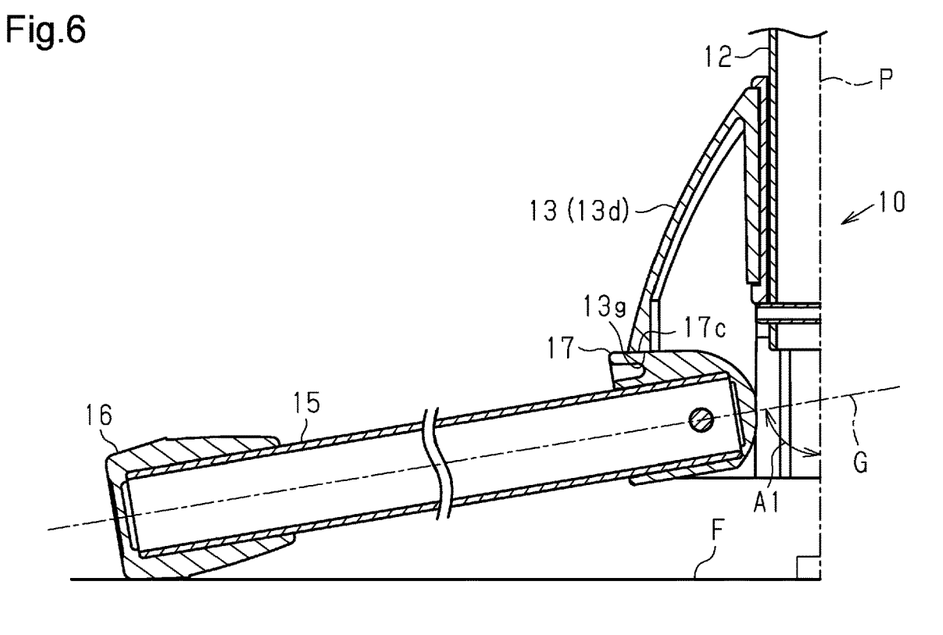
FIG. 6 is a partial cross-sectional view illustrating an opening state of a leg before the leg opening angle changing member shown in FIG. 1 is attached.
Figure 7:
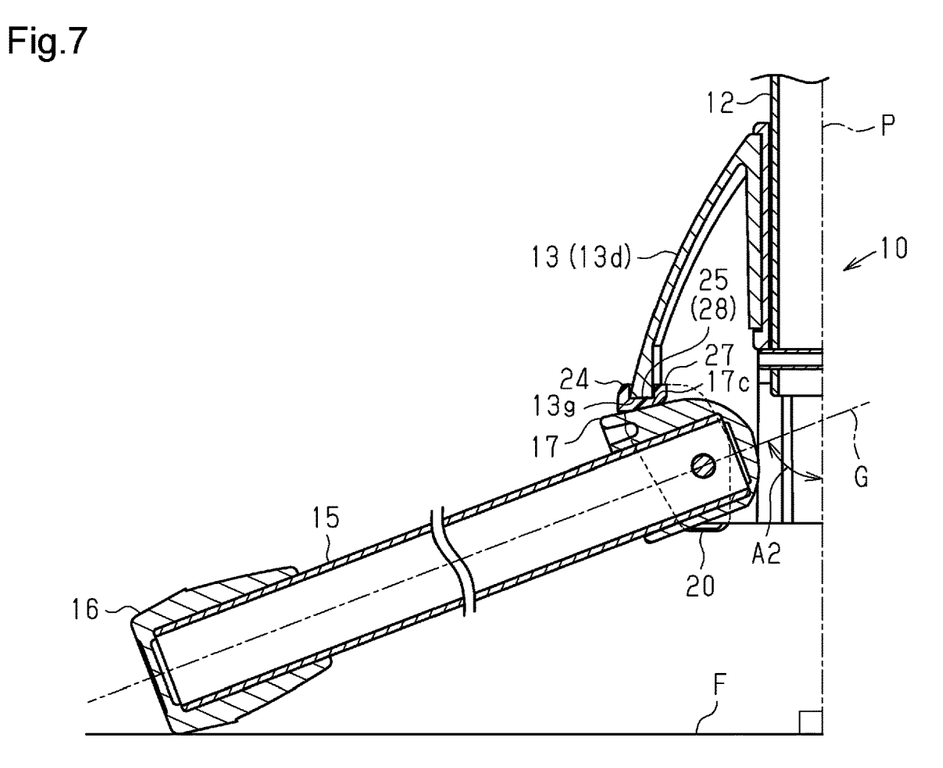
FIG. 7 is a partial cross-sectional view illustrating an opening state of the leg after the leg opening angle changing member shown in FIG. 1 is attached.

Operation of the above-described leg opening angle changing member 20 will now be described with reference to FIGS. 2, 6, and 7. As shown in FIGS. 6 and 7, the microphone stand 10 is placed on a floor surface F such that an axis P of the pipe 12 is perpendicular to the floor surface F.

FIG. 6 illustrates the microphone stand 10 in a state in which the leg 15 is opened without attaching the leg opening angle changing member 20 to the leg attaching portion 13c. In this state, the leg 15 is fully opened by opening the leg 15 until the upper surface 17c of the leg holder 17 contacts the lower edge 13g of the extension wall 13d. If the angle formed by the axis P of the pipe 12 and the axis G of the legs 15 is defined as an opening angle of the leg 15, the opening angle of the leg 15 is A1.

A series of steps for attaching the leg opening angle changing member 20 to the leg attaching portion 13c will now be described. First, after a leg 15a on the right side in FIG. 2 is closed as shown in FIG. 2, the leg opening angle changing member 20 is held to be oriented as shown and then attached to the leg attaching portion 13c from the front side of the base 13. At this time, the lower edge 13g of the extension wall 13d is first fitted into the fitting recess 28 of the leg opening angle changing member 20. Then, in a state in which the entire leg opening angle changing member 20 is deformed so as to spread the attachment holes 23a outward, the bolt head 19a is fitted into one of the attachment holes 23a, and the nut 21 is fitted into the other attachment hole 23a. At the same time, the stoppers 23b of the attachment portions 23 are fitted into the fit-in portions 13h of the base 13. In this manner, the attachment portions 23 are attached to the side walls 13e of the base 13, so that the leg opening angle changing member 20 is attached to the leg attaching portion 13c so as not to come off even if the leg 15a is closed. For each of the remaining two legs 15, the leg opening angle changing member 20 is attached to the leg attaching portion 13c through the same steps for the leg 15a.

FIG. 7 illustrates the microphone stand 10 in a state in which the leg 15 is opened after attaching the leg opening angle changing member 20 to the leg attaching portion 13c. In this state, the leg 15 can be opened until the upper surface 17c of the leg holder 17 contacts the insertion portion 25 of the leg opening angle changing member 20. In this case, an opening angle A2 of the leg 15 is smaller than the opening angle A1 of the leg 15 in the fully open state by the amount corresponding to the thickness of the insertion portion 25 arranged between the lower edge 13g of the extension wall 13d and the leg holder 17.

In this state, the attachment portions 23 are locked to the side walls 13e of the base 13 by fitting the bolt head 19a into one of the attachment holes 23a and fitting the nut 21 into the other attachment holes 23a. This allows the insertion portion 25 to remain between the lower edge 13g of the extension wall 13d and the leg holder 17, thereby maintaining the changed opening angle of the leg 15. When removing the leg opening angle changing member 20 from the leg attaching portion 13c, it only suffices to disengage the bolt head 19a and the nut 21 from the attachment holes 23a while deforming the entre leg opening angle changing member 20.

The first embodiment thus achieves the following advantages.

(1-1) The leg opening angle changing member 20 is attached to the leg attaching portion 13c when used. With this configuration, the insertion portion 25 is arranged between the lower edge 13g of the extension wall 13d and the leg holder 17 in a state in which the leg opening angle changing member 20 is attached to the leg attaching portion 13c. The opening angle of the leg 15 is changed to an opening angle smaller than the opening angle of the leg 15 in the fully opened state. After the opening angle of the legs 15 is changed, the leg opening angle changing member 20 is attached to the leg attaching portion 13c by means of the attachment portions 23. This allows the insertion portion 25 to remain between the lower edge 13g of the extension wall 13d and the leg holder 17, thereby maintaining the changed opening angle of the leg 15. With this configuration, the opening angle of the legs 15 is changed simply by arranging the insertion portion 25 between the lower edge 13g of the extension wall 13d and the leg holder 17. The structure and operation are thus both simple. It is therefore possible to change the opening angle of the leg 15 and maintain the changed opening angle with a simple structure.

(1-2) The attachment portions 23 are locked to the side walls 13e of the base 13 by fitting the bolt head 19a into one of the attachment holes 23a and fitting the nut 21 into the other attachment holes 23a. With this configuration, since the attachment portions 23 are locked to the side walls 13e after the opening angle of the leg 15 is changed, the leg opening angle changing member 20 is prevented from coming off the leg attaching portion 13c. For example, during the use of the microphone stand 10, the leg opening angle changing member 20 is prevented from being removed from the leg attaching portion 13c in the axial direction of the leg 15. It is thus easy to maintain the changed opening angle of the leg 15.

(1-3) The bolt head 19a and the nut 21 are projections provided on the side walls 13e of the base 13 and are provided at positions corresponding to the attachment holes 23a of the attachment portions 23. The attachment portions 23 are attached to the side walls 13e of the base 13 by fitting a bolt head 19a into one of the attachment holes 23a and fitting the nut 21 into the other attachment hole 23a. With this configuration, the attachment portions 23 are attached to the side walls 13e by engaging the attachment holes 23a with the bolt head 19a and the nut 21, so that the leg opening angle changing member 20 is attached to the leg attaching portion 13c. In this state, the engaging force between the attachment holes 23a and each of the bolt head 19a and the nut 21 maintains the leg opening angle changing member 20 at a position corresponding to an opening angle that is smaller than the opening angle of the leg 15 in the fully opened state. Thus, after the opening angle of the leg 15 is changed, the changed opening angle of the leg 15 is easily maintained by leg opening angle changing member 20.

(1-4) At the center of the back surface of the first connecting section 24a, a space is defined by the back surface of the first connecting section 24a, the upper surface of the insertion portion 25, and the front surface of the protrusion 27. The space functions as a fitting recess 28. The fitting recess 28 is engaged with the lower edge 13g of the extension wall 13d, which functions as a fitting projection, when the leg opening angle changing member 20 is attached to the leg attaching portion 13c. With this configuration, the leg opening angle changing member 20 is attached to the leg attaching portion 13c by locking the attachment portions 23 to the side walls 13e of the base 13 and by fitting the lower edge 13g of the extension wall 13d into the fitting recess 28. In this state, the leg opening angle changing member 20 is reliably maintained at a position corresponding to an opening angle that is smaller than the opening angle of the leg 15 in the fully opened state by the locking force between the attachment portions 23 and the side walls 13e and the fitting force between the lower edge 13g of the extension wall 13d and the fitting recess 28. For example, during the use of the microphone stand 10, the leg opening angle changing member 20 is prevented from being removed from the leg attaching portion 13c in the axial direction of the leg 15. Thus, after the opening angle of the leg 15 is changed, the changed opening angle of the leg 15 is easily maintained by leg opening angle changing member 20.

(1-5) The leg opening angle changing member 20 is configured to be attached to and detached from the leg attaching portion 13c of the base 13. With this configuration, the leg opening angle changing member 20 is attached to the leg attaching portion 13c, so that the insertion portion 25 is arranged between the lower edge 13g of the extension wall 13d and the leg holder 17. The opening angle of the leg 15 is changed to an opening angle smaller than the opening angle of the leg 15 in the fully opened state. The insertion portion 25 is removed from between the lower edge 13g of the extension wall 13d and the leg holder 17 by removing the leg opening angle changing member 20 from the leg attaching portion 13c. The opening angle of the leg 15 is returned to the opening angle of the leg 15 in the fully opened state. That is, by simply attaching or detaching the leg opening angle changing member 20 to or from the leg attaching portion 13c, the opening angle of the leg 15 can be changed to an opening angle smaller than the opening angle of the leg 15 in the fully opened state or can be returned to the opening angle of the leg 15 in the fully opened state.

For example, in a case in which multiple microphone stands 10 are set around a drum set, the tripods of the respective microphone stands 10 must not contact each other. In such a case, the leg opening angle changing members 20 are used to change the opening angle of each leg 15 to an opening angle smaller than the opening angle of the leg 15 in the fully opened state. In this manner, the tripod of a microphone stand 10, of which the opening angles of the legs 15 have been reduced by using the leg opening angle changing members 20, is set so as not to contact the tripod of another microphone stand 10 of which the legs 15 are fully opened. Since the tripods are prevented from contacting each other, a relatively small storage space is needed when storing the microphone stands 10 collectively in one place.

(1-6) The leg opening angle changing member 20 is made of a plastic and has the shape of a U as a whole. This configuration allows the leg opening angle changing member 20, which has the shape of a U, to be attached to the leg attaching portion 13c or to be detached from the leg attaching portion 13c by deforming the entire leg opening angle changing member 20. For example, the leg opening angle changing member 20 can be easily attached to the leg attaching portion 13c by deforming the leg opening angle changing member 20, which has the shape of a U, to spread the sides outward after fitting the lower edge 13g of the extension wall 13d into the fitting recess 28 of the leg opening angle changing member 20. Also, the leg opening angle changing member 20 is easily removed from the leg attaching portion 13c by performing a reverse procedure to the above-described procedure. This allows the leg opening angle changing member 20 to be easily attached to and detached from the leg attaching portion 13c.

(1-7) Each leg opening angle changing member 20 includes two attachment portions 23, a connecting portion 24, and an insertion portion 25. The connecting portion 24 has an elongated shape and is curved to protrude forward from the leg opening angle changing member 20. With this configuration, deforming the connecting portion 24, which is curved to protrude forward, allows the leg opening angle changing member 20 to be attached to the leg attaching portion 13c while deforming substantially the entire leg opening angle changing member 20. The same applies to a case in which the leg opening angle changing member 20 is detached from the leg attaching portion 13c. This allows the leg opening angle changing member 20 to be easily attached to and detached from the leg attaching portion 13c. The connecting portion 24, which is curved to protrude forward from the leg opening angle changing member 20, provides the front surface, which is an ornamental surface of the leg opening angle changing member 20. It is thus possible to make the leg opening angle changing member 20 inconspicuous when attached to the leg attaching portion 13c. This improves the aesthetic appearance of the base 13 in a region including the leg attaching portion 13c.

(1-8) The insertion portion 25 extends rearward from the center of the back surface of the first connecting section 24a. Also, the first connecting section 24a includes the fitting recess 28 at the center of the back surface. With this configuration, the insertion portion 25 and the fitting recess 28 are provided at the center of the back surface of the connecting portion 24, that is, at the middle position between the attachment portions 23. Thus, after the opening angle of the leg 15 is changed, the leg opening angle changing member 20 is attached to the leg attaching portion 13c so as to contact the base 13 at the sides and the vicinity of the center. This restricts the leg opening angle changing member 20 from being removed easily from the leg attaching portion 13c, so that the leg 15 is stably maintained at the changed opening angle.

Second Embodiment

A leg opening angle changing member 50 according to a second embodiment will now be described with reference to FIGS. 8 to 12B. Like or the same reference numerals are given to those components in the second embodiment that are like or the same as the corresponding components of the first embodiment.

Figure 8:
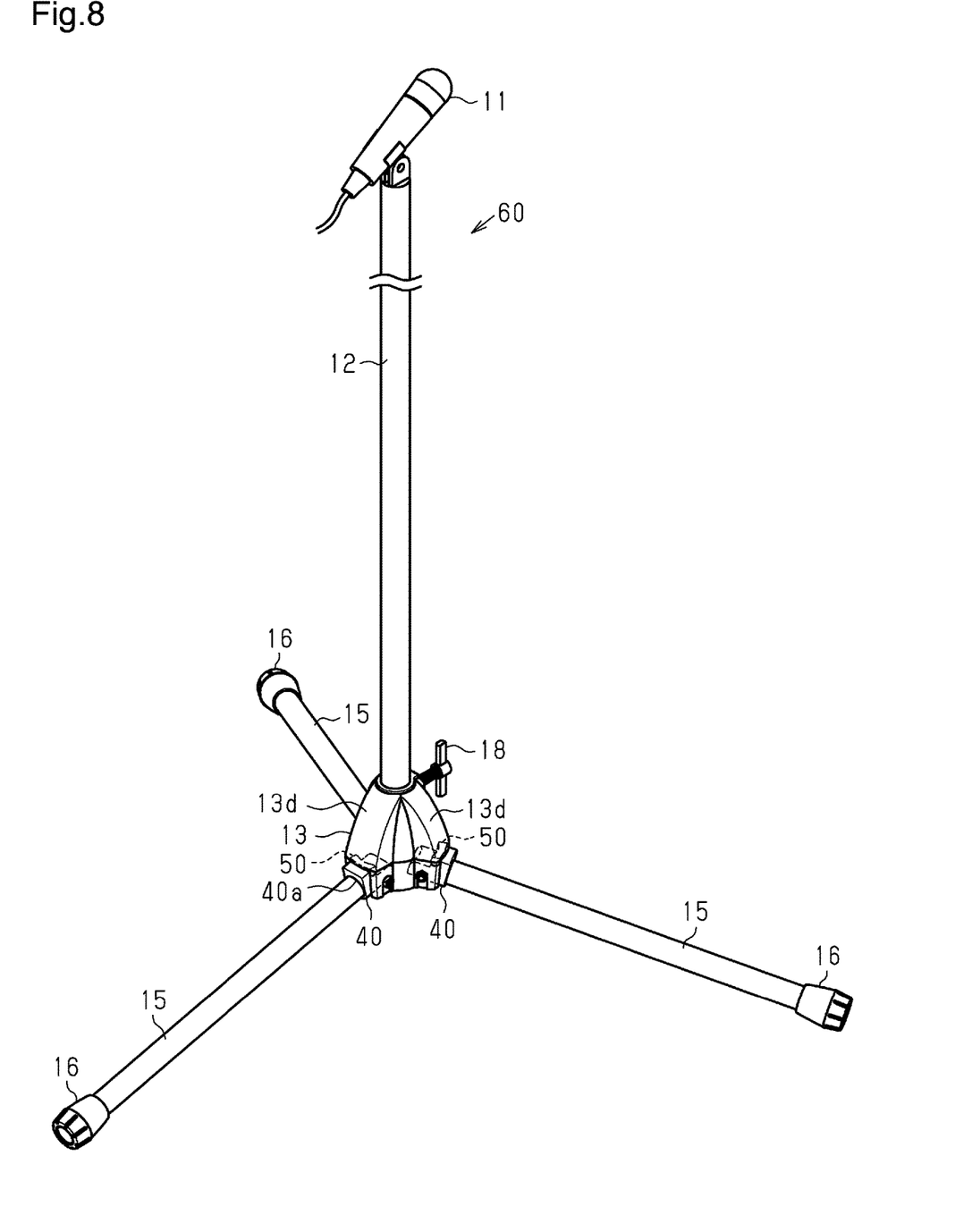
FIG. 8 is a perspective view of a microphone stand that includes leg opening angle changing members according to a second embodiment of the present disclosure.
Figure 9:
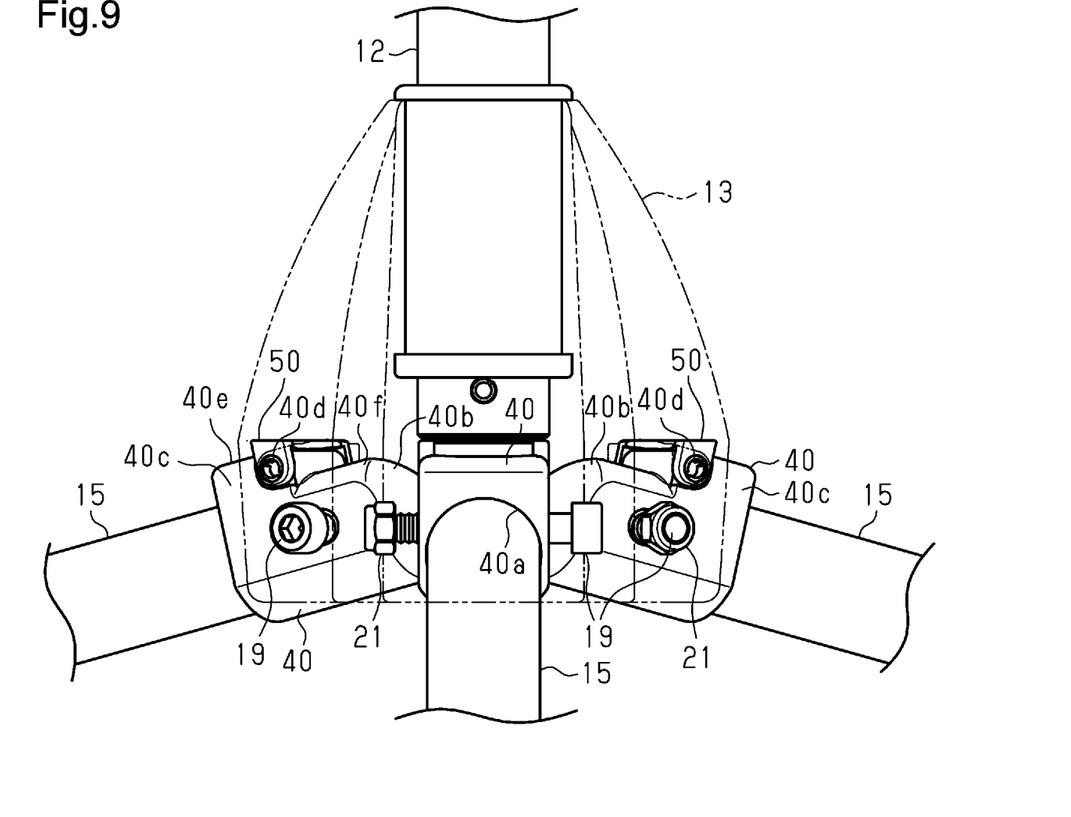
FIG. 9 is a partial front view of a structure including the proximal ends of legs to each of which the leg opening angle changing member shown in FIG. 8 is attached.

As shown in FIGS. 8 and 9, a microphone stand 60 includes a base 13, to which the lower end of a pipe 12 is fixed, and three legs 15, which are attached to the base 13 in an openable manner and each include a leg opening angle changing member 50. The leg opening angle changing member 50 is attached to the proximal end of each leg 15 in advance. A leg holder 40, which is a middle member, is attached to the proximal end of each leg 15. The leg holder 40 is configured such that the leg opening angle changing member 50 is attached to the leg holder 40.

The leg holder 40 includes an opening 40a, into which the proximal end of the leg 15 is fitted, a covering portion 40b, which is provided on a side opposite to the opening 40a, and an attachment portion 40c, to which the leg opening angle changing member 50 is attached. The attachment portion 40c is provided between the center in an upper part of the leg holder 40 and the opening 40a. The attachment portion 40c includes projections 40d on its side walls. The leg holder 40 includes a flat first upper surface 40e in a section corresponding to the attachment portion 40c. The leg holder 40 also includes a curved second upper surface 40f between the center in the upper part and the covering portion 40b.

Figure 10:
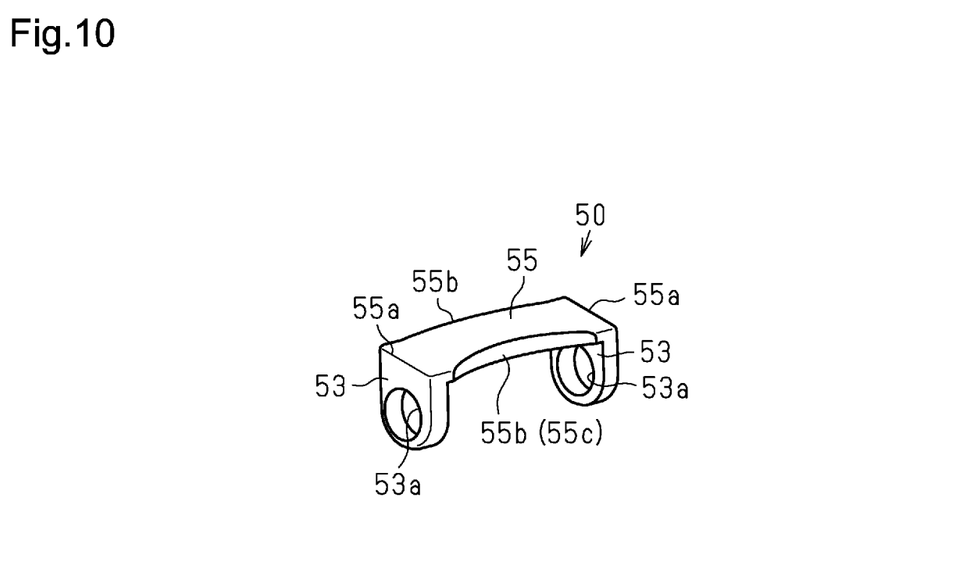
FIG. 10 is a perspective view of the leg opening angle changing member shown in FIG. 8.

As shown in FIG. 10, the leg opening angle changing member 50 includes two attachment portions 53 and an insertion portion 55, which connects the attachment portions 53 to each other. The leg opening angle changing member 50 has the shape of a U as a whole. The leg opening angle changing member 50 is pivotally attached to the proximal end of each leg 15 by means of the leg holder 40. The leg opening angle changing member 50 is pivotable between an ON position indicated by the solid lines in FIG. 12A and an OFF position shown in FIG. 11A. That is, the leg opening angle changing member 50 can be switched between the ON position and the OFF position when attached to the leg holder 40. The leg opening angle changing member 50 is configured to arrange, when switched to the ON position, the insertion portion 55 between the lower edge 13g of the extension wall 13d of the base 13 and the leg holder 40.

The attachment portions 53 are attached to the projections 40d of the leg holder 40 in a state in which the leg opening angle changing member 50 is attached to the leg holder 40. The attachment portions 53 each have an attachment hole 53a, which is a recess. In the attachment portion 40c of the leg holder 40, the projections 40d are respectively provided at positions corresponding to the attachment holes 53a of the attachment portions 53. When the projections 40d of the leg holder 40 are respectively fitted into the attachment holes 53a of the attachment portions 53, the attachment portions 53 are locked to the leg holder 40 attached to the proximal end of the leg 15. In this state, the leg opening angle changing member 50 is attached to the proximal end of the leg 15 by means of the leg holder 40 so as not to move in the axial direction of the leg 15.

The insertion portion 55 has a substantially rectangular and flat shape. The insertion portion 55 includes two ends 55a, which are connected to the attachment portions 53, and two edges 55b, which extend in the longitudinal direction of the insertion portion 55. The back surface of the insertion portion 55 is brought into contact with the first upper surface 40e of the leg holder 40 when the leg opening angle changing member 50 is switched to the ON position. One of the edges 55b includes a contact surface 55c, which is brought into contact with the second upper surface 40f of the leg holder 40 when the leg opening angle changing member 50 is switched to the OFF position. The contact surface 55c is curved to have a concave shape in accordance with the second upper surface 40f.

Operation of the above-described leg opening angle changing member 50 will now be described with reference to FIGS. 11A to 12B.

Figure 11A:
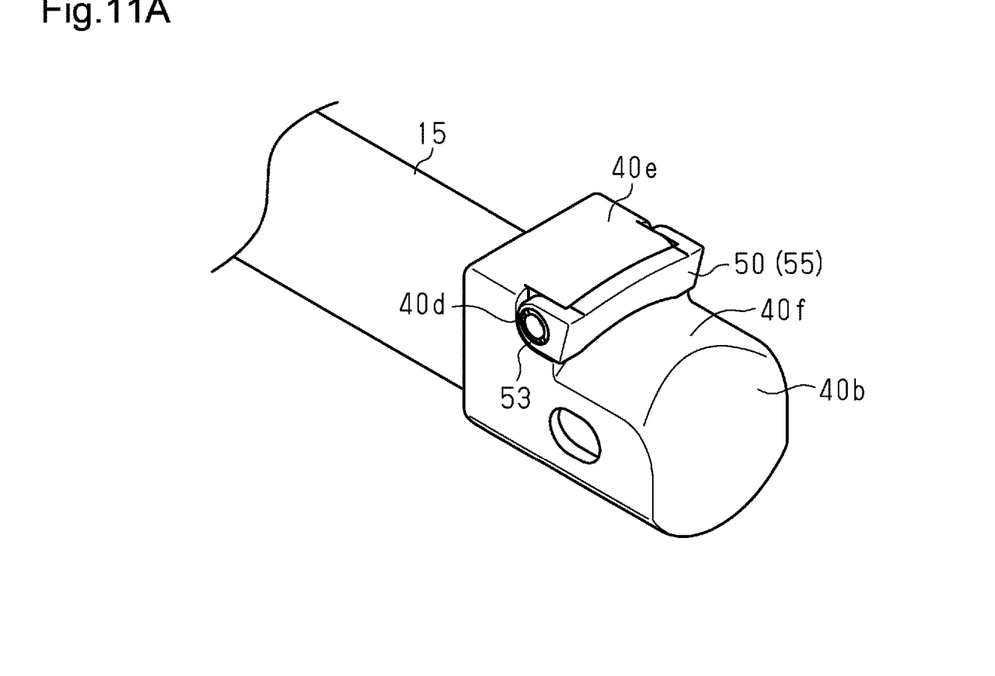
FIG. 11A is a partial perspective view illustrating a state in which the leg opening angle changing member attached to the proximal end of a leg shown in FIG. 8 has been switched to an OFF position.
Figure 11B:
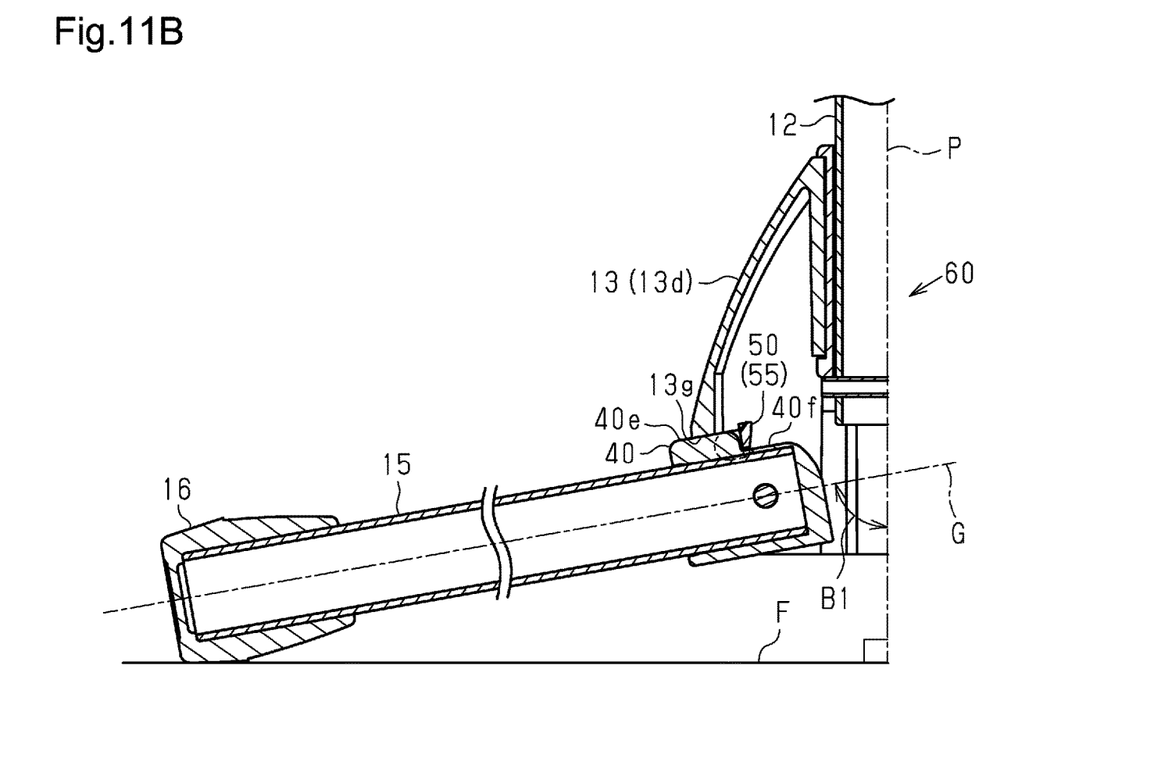
FIG. 11B is a partial cross-sectional view illustrating an opening state of the leg when the leg opening angle changing member shown in FIG. 8 has been switched to the OFF position.

FIGS. 11A and 11B respectively show the leg opening angle changing member 50 switched to the OFF position and the microphone stand 60 with the leg 15 opened in a state in which the leg opening angle changing member 50 is switched to the OFF position. In this state, the leg 15 is fully opened by opening the leg 15 until the lower edge 13g of the extension wall 13d contacts the first upper surface 40e of the leg holder 40. In this case, the opening angle of the leg 15 is B1. When switching the leg opening angle changing member 50 from the OFF position to the ON position, the leg 15 is first closed. Then, the leg opening angle changing member 50 is pivoted about the projections 40d of the leg holder 40 until the insertion portion 55 contacts the first upper surface 40e of the leg holder 40. The leg 15 is opened after the leg opening angle changing member 50 is pivoted.

Figure 12A:
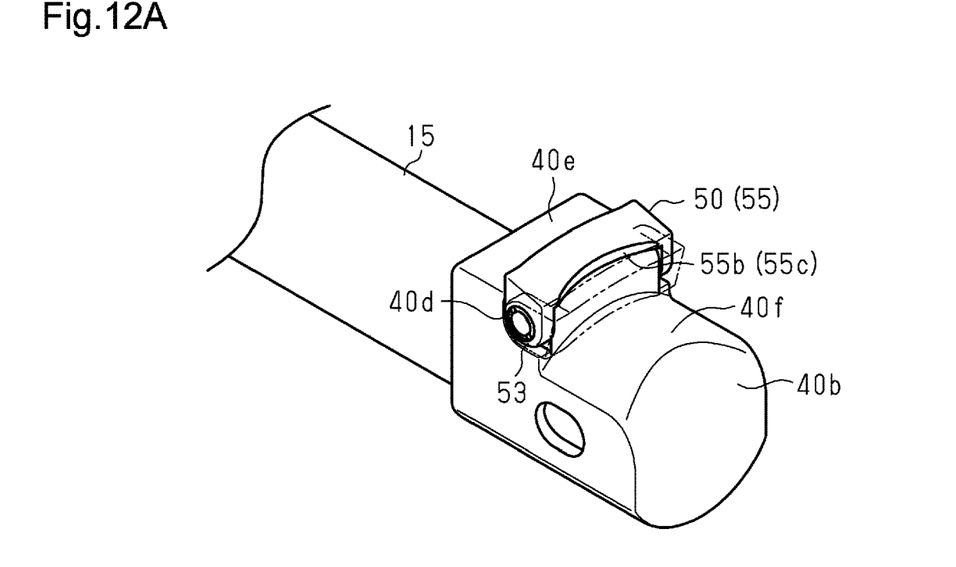
FIG. 12A is a partial perspective view illustrating a state in which the leg opening angle changing member attached to the proximal end of the leg shown in FIG. 8 has been switched to an ON position.
Figure 12B:
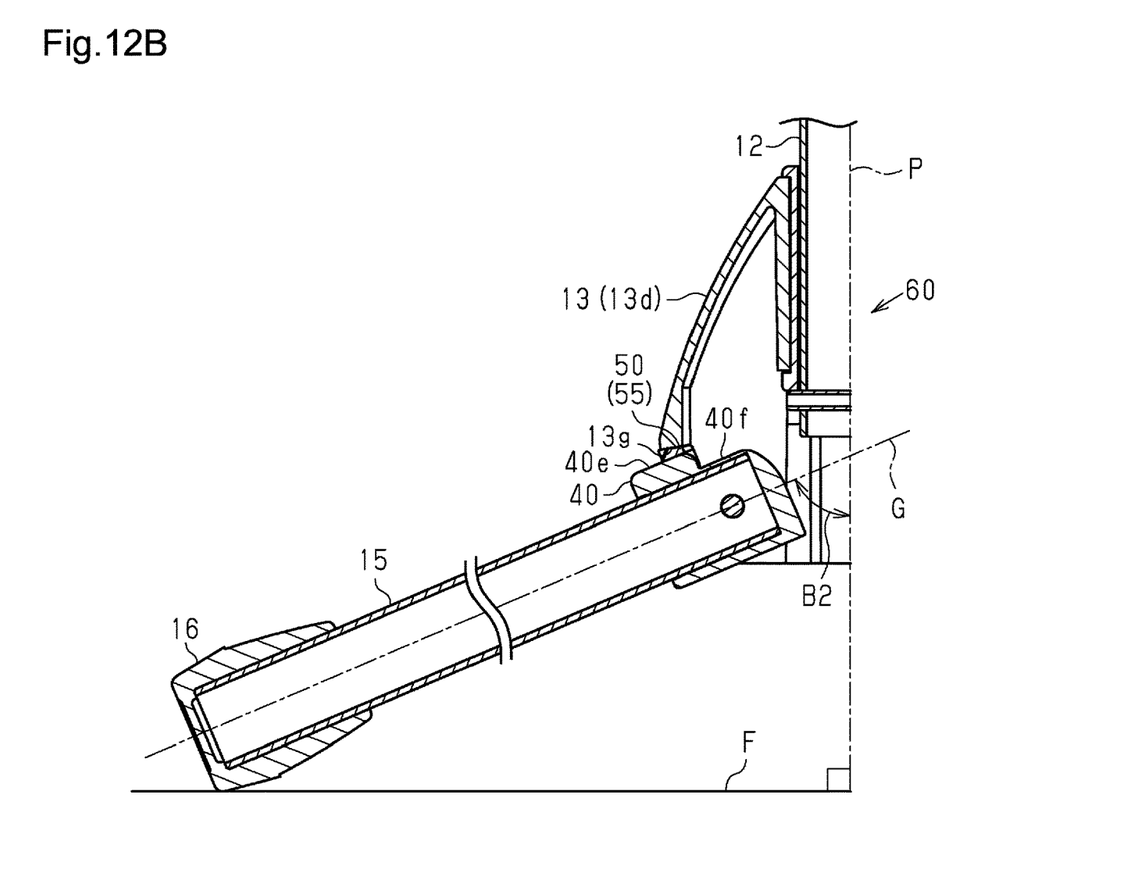
FIG. 12B is a partial cross-sectional view illustrating an opening state of the leg when the leg opening angle changing member shown in FIG. 8 has been switched to the ON position.

FIGS. 12A and 12B respectively show the leg opening angle changing member 50 switched to the ON position and the microphone stand 60 with the leg 15 opened in a state in which the leg opening angle changing member 50 is switched to the ON position. In this state, the leg 15 can be opened until the lower edge 13g of the extension wall 13d contacts the insertion portion 55 of the leg opening angle changing member 50. In this case, since the insertion portion 55 is arranged between the lower edge 13g of the extension wall 13d and the leg holder 40, an opening angle B2 of the leg 15 is smaller than the opening angle B1 of the leg 15 in the fully opened state by an amount corresponding to the thickness of the insertion portion 55 arranged between the lower edge 13g of the extension wall 13d and the leg holder 40. In this state, the leg opening angle changing member 50 is locked to the leg holder 40 by means of the attachment portions 53. This allows the insertion portion 55 to remain between the lower edge 13g of the extension wall 13d and the leg holder 40, thereby maintaining the changed opening angle of the leg 15. When switching the leg opening angle changing member 50 from the ON position to the OFF position, it suffices to first closing the leg 15 and pivot the leg opening angle changing member 50 about the projections 40d of the leg holder 40 until the insertion portion 55 contacts the second upper surface 40f of the leg holder 40.

The second embodiment thus achieves the following advantages.

(2-1) The leg opening angle changing member 50 is configured to be switched to the ON position or the OFF position when attached to the proximal end of the leg 15. With this configuration, the position of the leg opening angle changing member 50, which is attached to the proximal end of the legs 15 in advance, is changeable. This allows the insertion portion 55 to be arranged between the lower edge 13g of the extension wall 13d and the leg holder 40 and to be removed. That is, changing the position of the leg opening angle changing member 50 allows the opening angle of the leg 15 to be changed to the opening angle B2, which is smaller than the opening angle of the leg 15 in the fully opened state, or to be returned to the opening angle B1 of the leg 15 in the fully opened state. Also, since the leg opening angle changing member 50 is attached to the proximal end of each leg 15 in advance, the leg opening angle changing member 50 is prevented from being lost.

(2-2) The leg opening angle changing member 50 has a U-shape as a whole. This configuration allows the leg opening angle changing member 50 to be attached to the proximal end of the leg 15 so as to be pivotal about the sides of the leg opening angle changing member 50, that is, the attachment portions 53 to which the projections 40d of the leg holder 40 are fitted. Also, the leg opening angle changing member 50 includes two attachment portions 53 and an insertion portion 55, which connects the attachment portions 53 to each other. With this configuration, since the two attachment portions 53 stabilize the attachment of the leg opening angle changing member 50 to the proximal end of the leg 15, the leg opening angle changing member 50 can be switched to the ON position and the OFF position in a stable manner.

(2-3) The leg opening angle changing member 50 is pivotal between the ON position, at which the insertion portion 55 is arranged between the lower edge 13g of the extension wall 13d and the leg holder 40, and the OFF position, at which the insertion portion 55 is removed. With this configuration, the leg opening angle changing member 50, which is attached to the proximal end of the legs 15 in advance, is pivotal. This allows the insertion portion 55 to be arranged between the lower edge 13g of the extension wall 13d and the leg holder 40 and to be removed. That is, the opening angle of the leg 15 can, through simple operations, be changed to the opening angle B2, which is smaller than the opening angle of the leg 15 in the fully opened state, or be returned to the opening angle B1 of the leg 15 in the fully opened state. The use of the leg opening angle changing member 50 allows the opening angle of the leg 15 to be changed with a single motion. This allows multiple microphone stands 60 to be set in a limited space and to be stored collectively in a small storage space after being used.

(2-4) The leg opening angle changing member 50 is pivotally attached to the proximal end of each leg 15 by means of the leg holder 40. With this configuration, since the leg opening angle changing member 50 is indirectly attached to the proximal end of the leg 15 by means of the leg holder 40, the shape of the leg opening angle changing member 50 is not limited by the shape of the proximal end of the leg 15. This adds to the flexibility in the shape of the leg opening angle changing member 50.

The above-described embodiments may be modified as follows.

In the first embodiment, the leg attaching portion 13c, to which the leg opening angle changing member 20 is attached, is an opening to which the proximal end of the leg 15 is inserted and fixed. However, the leg attaching portion 13c may be a protrusion on the outer surface of the base 13. In this case, it suffices to attach, by means of the attachment portions 23, the leg opening angle changing member 20 to any of the extension wall 13d of the base 13, the side walls 13e, and a portion that projects from the outer surface of the base 13. The leg opening angle changing member 20 may be attached to the proximal end of the leg 15 or the leg holder 17, which is attached to the proximal end of the leg 15, instead of the base 13.

In the first embodiment, the bolt head 19a and the nut 21 are fitted into the attachment holes 23a so as to lock the attachment portions 23 to the side walls 13e of the base 13. Instead, the attachment portions 23 may each include a projection, and the base 13 may have recesses, such as holes, to which the projections of the attachment portions 23 are locked.

In the first embodiment, the attachment portions 23 of the leg opening angle changing member 20 are configured such that the bolt head 19a and the nut 21 are fitted into the attachment holes 23a. However, the attachment portions 23 may be configured to be locked to parts of the open end of the leg attaching portion 13c. For example, the attachment portions 23 or the insertion portion 25 may be provided with a projection that can be locked to the open end of the leg attaching portion 13c, so as to prevent the leg opening angle changing member 20 from being removed from the leg attaching portion 13c in the axial direction of the leg 15.

In the first embodiment, the leg opening angle changing member 20 includes the two attachment portions 23 so as to have the shape of a U as a whole. One or both of the attachment portions 23 may be omitted so that the leg opening angle changing member 20 may have the shape of an L or an I as a whole. In this case, in place of the attachment portions 23 shown in FIGS. 4 and 5, fasteners such as screws and bolts, an adhesive member such as adhesion tape, or magnet sheets may be used to attach the leg opening angle changing member 20 to a section including the leg attaching portion 13c of the base 13.

In the first embodiment, the insertion portion 25 does not necessarily need to be provided with the protrusion 27, and the fitting recess 28 may be omitted from the leg opening angle changing member 20.

In the second embodiment, the leg attaching portion to which the leg opening angle changing member 50 is attached is the leg holder 40, which is attached to the proximal end of the leg 15. However, the leg opening angle changing member 50 may be directly attached to the proximal end of the leg 15. Also, in place of the proximal end of the leg 15, the leg opening angle changing member 50 may be attached to the leg attaching portion of the base 13.

In the second embodiment, the projections 40d are fitted into the attachment holes 53a, so that the attachment portions 53 are locked to the attachment portion 40c of the leg holder 40. Instead, the attachment portions 53 may each be provided with a projection and the leg holder 40 may have recesses, such as holes, to which the projections of the attachment portions 53 are locked.

In the second embodiment, the leg opening angle changing member 50 is pivotal with respect to the proximal end of the leg 15. However, the leg opening angle changing member 50 may be slidable between the ON position and the OFF position on the proximal end of the leg 15.

In the second embodiment, the leg opening angle changing member 50 is configured to be switched to two positions, which are the ON position and the OFF position, when attached to the proximal end of the leg 15. However, the leg opening angle changing member 50 may be switched to three or more positions.

In the above-illustrated embodiments, the present disclosure is employed in microphone stands. However, the present disclosure may be employed in any type of stand that includes a tripod, such as a cymbal stand or a music stand.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A leg opening angle changing member for a stand that changes a leg opening angle of the stand, wherein
    the stand includes a base to which the leg is openably attached,
    the base includes a leg attaching portion to which a proximal end of the leg is attached,
    the leg opening angle changing member comprises:
        an insertion portion arranged between the leg attaching portion and the proximal end of the leg, and
        an attachment portion attached to the leg attaching portion,
    the leg opening angle changing member is attached to the leg attaching portion by means of the attachment portion,
    the leg opening angle changing member is configured to change the leg opening angle to an opening angle smaller than an opening angle of the leg in a fully opened state by arranging the insertion portion between the leg attaching portion and the proximal end of the leg in a state in which the leg opening angle changing member is attached to the leg attaching portion,
    the leg opening angle changing member is configured to be attached to and detached from the leg attaching portion with the leg being attached to the leg attaching portion, and
    the leg opening angle changing member is configured such that the insertion portion is arranged between the leg attaching portion and the proximal end of the leg when the leg opening angle changing member is attached to the leg attaching portion.

2. The leg opening angle changing member for the stand according to claim 1, wherein the leg opening angle changing member can be locked to the leg attaching portion in a state in which the leg opening angle changing member has changed the leg opening angle to the opening angle smaller than the opening angle of the leg in the fully opened state.

3. The leg opening angle changing member for the stand according to claim 1, wherein
    one of a projection and a recess is provided in the attachment portion, and the other one of the projection and the recess is provided in the leg attaching portion, and
    the attachment portion is attached to the leg attaching portion through engagement of the projection and the recess with each other.

4. The leg opening angle changing member for the stand according to claim 3, wherein
    the recess is a hole in the attachment portion,
    the projection is provided on the leg attaching portion at a position that corresponds to the attachment portion.

5. The leg opening angle changing member for the stand according to claim 1, wherein
    the leg attaching portion includes a fitting projection,
    the leg opening angle changing member includes a fitting recess, and the fitting recess is fitted to the fitting projection in a state in which the leg opening angle changing member is attached to leg attaching portion.

6. The leg opening angle changing member for the stand according to claim 1, wherein the leg opening angle changing member has a U-shape as a whole.

7. The leg opening angle changing member for the stand according to claim 6, further comprising:
    two attachment portions attached to the leg attaching portion; and
    a connecting portion that connects ends of the attachment portions to each other, the connecting portion being curved to protrude forward from the leg opening angle changing member,
    wherein the leg opening angle changing member is configured such that the insertion portion can be arranged between the leg attaching portion and the proximal end of the leg when the leg opening angle changing member is attached to the leg attaching portion.

8. The leg opening angle changing member for the stand according to claim 7, wherein the insertion portion is provided at a center of a back surface of the connecting portion.

9. The leg opening angle changing member for the stand according to claim 1, wherein the leg opening angle changing member is configured such that a position of the leg opening angle changing member with respect to the leg attaching portion or the proximal end of the leg can be changed in a state in which the leg opening angle changing member is attached to leg attaching portion or the proximal end of the leg, and the insertion portion can be arranged between the leg attaching portion and the proximal end of the leg by changing a position of the leg opening angle changing member.

10. The leg opening angle changing member for the stand according to claim 9, wherein
the leg attaching portion or the proximal end of the leg includes a middle member that is arranged between the base and the leg, and
the leg opening angle changing member is attached to the leg attaching portion or the proximal end of the leg by means of the middle member.

11. The leg opening angle changing member for the stand according to claim 9, wherein
the attachment portion is one of two attachment portions, and
the leg opening angle changing member is attached to the leg attaching portion or the proximal end of the leg by means of the attachment portions.

12. The leg opening angle changing member for the stand according to claim 11, wherein the leg opening angle changing member is pivotally attached to the proximal end of the leg.

13. A stand, comprising:
an elongated member to which an item is attached;
a base to which a lower end of the elongated member is fixed;
legs openably attached to the base; and
leg opening angle changing members configured to change opening angles of the respective legs, wherein
the base includes leg attaching portions to which proximal ends of the respective legs are attached,
each leg opening angle changing member includes:
an insertion portion arranged between the leg attaching portion and the proximal end of the leg; and
an attachment portion attached to the leg attaching portion,
each leg opening angle changing member is attached to the leg attaching portion by means of the attachment portion,
each leg opening angle changing member is configured to change the leg opening angle to an opening angle smaller than an opening angle of the leg in a fully opened state by arranging the insertion portion between the leg attaching portion and the proximal end of the leg in a state in which the leg opening angle changing member is attached to the leg attaching portion,
the leg opening angle changing member is configured to be attached to and detached from the leg attaching portion with the leg being attached to the leg attaching portion, and
the leg opening angle changing member is configured such that the insertion portion is arranged between the leg attaching portion and the proximal end of the leg when the leg opening angle changing member is attached to the leg attaching portion.

* * * * *